US008390239B2

United States Patent
Zhao

(10) Patent No.: US 8,390,239 B2
(45) Date of Patent: *Mar. 5, 2013

(54) CONTROL CIRCUIT FOR SINGLE-PHASE AC MOTOR OF DRYER

(75) Inventor: Yong Zhao, Zhongsham (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 315 days.

This patent is subject to a terminal disclaimer.

(21) Appl. No.: 12/877,123

(22) Filed: Sep. 8, 2010

(65) Prior Publication Data

US 2011/0193511 A1    Aug. 11, 2011

(30) Foreign Application Priority Data

Feb. 9, 2010    (CN) ...................... 2010 2 0119698 U

(51) Int. Cl.
H02P 1/42    (2006.01)
(52) U.S. Cl. ......... 318/786; 318/727; 318/767; 318/778
(58) Field of Classification Search .................. 318/727, 318/753, 756, 766, 767, 774, 778, 786
See application file for complete search history.

(56) References Cited

U.S. PATENT DOCUMENTS

| | | | | |
|---|---|---|---|---|
| 5,969,497 A * | 10/1999 | McDonald et al. | ........... | 318/778 |
| 6,636,013 B2 * | 10/2003 | Zeh | ................ | 318/727 |
| 7,408,321 B2 * | 8/2008 | Smith | ........... | 318/788 |
| 7,612,519 B2 * | 11/2009 | Smith | ........... | 318/788 |
| 7,948,202 B2 * | 5/2011 | Lu | ............... | 318/778 |
| 7,977,925 B2 * | 7/2011 | Larsen | ........... | 322/36 |
| 2009/0174356 A1 * | 7/2009 | Lu | ............... | 318/430 |
| 2011/0298413 A1 * | 12/2011 | Zhao | ............ | 318/786 |

* cited by examiner

Primary Examiner — Walter Benson
Assistant Examiner — Thai Dinh
(74) Attorney, Agent, or Firm — Matthias Scholl P.C.; Matthias Scholl

(57) ABSTRACT

A control circuit for a single-phase AC motor of a dryer, including at least an electronic starting circuit including at least a starting control unit, a first drive circuit, and a bidirectional triode thyristor, a second drive circuit, and a mechanical switch K. The bidirectional triode thyristor is serially connected to a starting winding and a starting capacitor of the motor, and connected to an AC input. The starting control unit is connected to a control end of the bidirectional triode thyristor via the first drive circuit. The mechanical switch K is serially connected to an electrical heating wire, and is connected to the AC input. The starting control unit is connected to a control end of the mechanical switch K via the second drive circuit. The first drive circuit and the second drive circuit are interlocked with each other.

8 Claims, 3 Drawing Sheets

CONTROL CIRCUIT FOR SINGLE-PHASE AC MOTOR OF DRYER

CROSS-REFERENCE TO RELATED APPLICATIONS

Pursuant to 35 U.S.C. §119 and the Paris Convention Treaty, this application claims the benefit of Chinese Patent Application No. 201020119698.6 filed on Feb. 9, 2010, the contents of which are incorporated herein by reference.

BACKGROUND OF THE INVENTION

1. Field of the Invention

The invention relates to a control circuit, and more particularly to a control circuit for a single-phase AC motor of a dryer.

2. Description of the Related Art

Recently, several control circuits for single-phase AC motors of dryers have appeared, and switching and drive circuits thereof use electronic power switches, such as silicon-controlled rectifiers, that feature convenient and superior control relative to prior art. However, there are still several problems with the conventional control circuit: circuit structure thereof is complex and cost thereof is high; in addition, as the switching and drive circuit is powered on, power of an electrical heating wire is high, current in a circuit is great, and heat value and electric loss of the electronic power switch are large.

SUMMARY OF THE INVENTION

In view of the above-described problem, it is one objective of the invention to provide a control circuit for a single-phase AC motor of a dryer that is capable of addressing the above-mentioned problems, and features simple circuit structure, low cost, and small electric loss.

To achieve the above objectives, in accordance with one embodiment of the invention, provided is a control circuit for a single-phase AC motor of a dryer, comprising an electronic starting circuit comprising a starting control unit, a first drive circuit, and a bidirectional triode thyristor, a second drive circuit, and a mechanical switch K. The bidirectional triode thyristor is serially connected to a starting winding and a starting capacitor of the motor, and connected to an AC input, the starting control unit is connected to a control end of the bidirectional triode thyristor via the first drive circuit, the mechanical switch K is serially connected to an electrical heating wire, and connected to the AC input, the starting control unit is connected to a control end of the mechanical switch K via the second drive circuit, and the first drive circuit and the second drive circuit are interlocked with each other whereby enabling the mechanical switch K to be switched off as the bidirectional triode thyristor is conducting, and the mechanical switch K to be switched on as the bidirectional triode thyristor is cut off.

In a class of this embodiment, the second drive circuit comprises an electromagnet coil L, the electromagnet coil L switches on the mechanical switch K as the second drive circuit is conducting, and the electromagnet coil L stops operating and the mechanical switch K is switched off as the second drive circuit is cut off.

In a class of this embodiment, the second drive circuit comprises a triode Q1, a collecting electrode of the triode Q1 is serially connected to a resistor R14, and connected to the electromagnet coil L, a base electrode thereof is serially connected to a resistor R10, and connected to an output end 7 of a post comparator IC2, an emitting electrode thereof is connected to an output end of the rectifying and voltage-stabilizing circuit, and conduction of the triode Q1 causes the electromagnet coil L to switch on the mechanical switch K and thus enabling electrical heating wire to operate.

In a class of this embodiment, the starting control unit comprises a rectifying and voltage-stabilizing circuit, a detecting circuit, and a voltage comparing circuit.

In a class of this embodiment, an input end of the rectifying and voltage-stabilizing circuit is connected to the AC input, and an output end of the rectifying and voltage-stabilizing circuit operates as a low-voltage DC power supply for the detecting circuit and the voltage comparing circuit.

In a class of this embodiment, the detecting circuit detects an electric signal from a main winding of the motor and inputs the electric signal to the voltage comparing circuit for further processing, and an output end of the voltage comparing circuit is connected to input ends of the first drive circuit and the second drive circuit.

In a class of this embodiment, the voltage comparing circuit is a hysteresis control circuit.

In a class of this embodiment, the first drive circuit is a photoelectric coupling circuit.

Advantages of the invention comprise: 1) the invention features simple circuit structure and low cost, and switching and drive control are implemented by way of controlling switch-on/off of the mechanical switch via the electromagnet coil, which makes control simple and convenient; as the drive circuit is powered on, current in the circuit, and heat value and electric loss of the electronic power switch are comparatively small; 2) the hysteresis control circuit is capable of switching off an operating loop of the motor of the dryer at a current higher than that of the main winding, and switching on the operating loop of the motor of the dryer at a current lower than that of the main winding, which facilitates accurate control, and improves working efficiency of the motor of the dryer.

DETAILED DESCRIPTION OF THE EMBODIMENTS

Detailed description will be given below in conjunction with specific embodiments and accompanying drawings.

Figure 1:
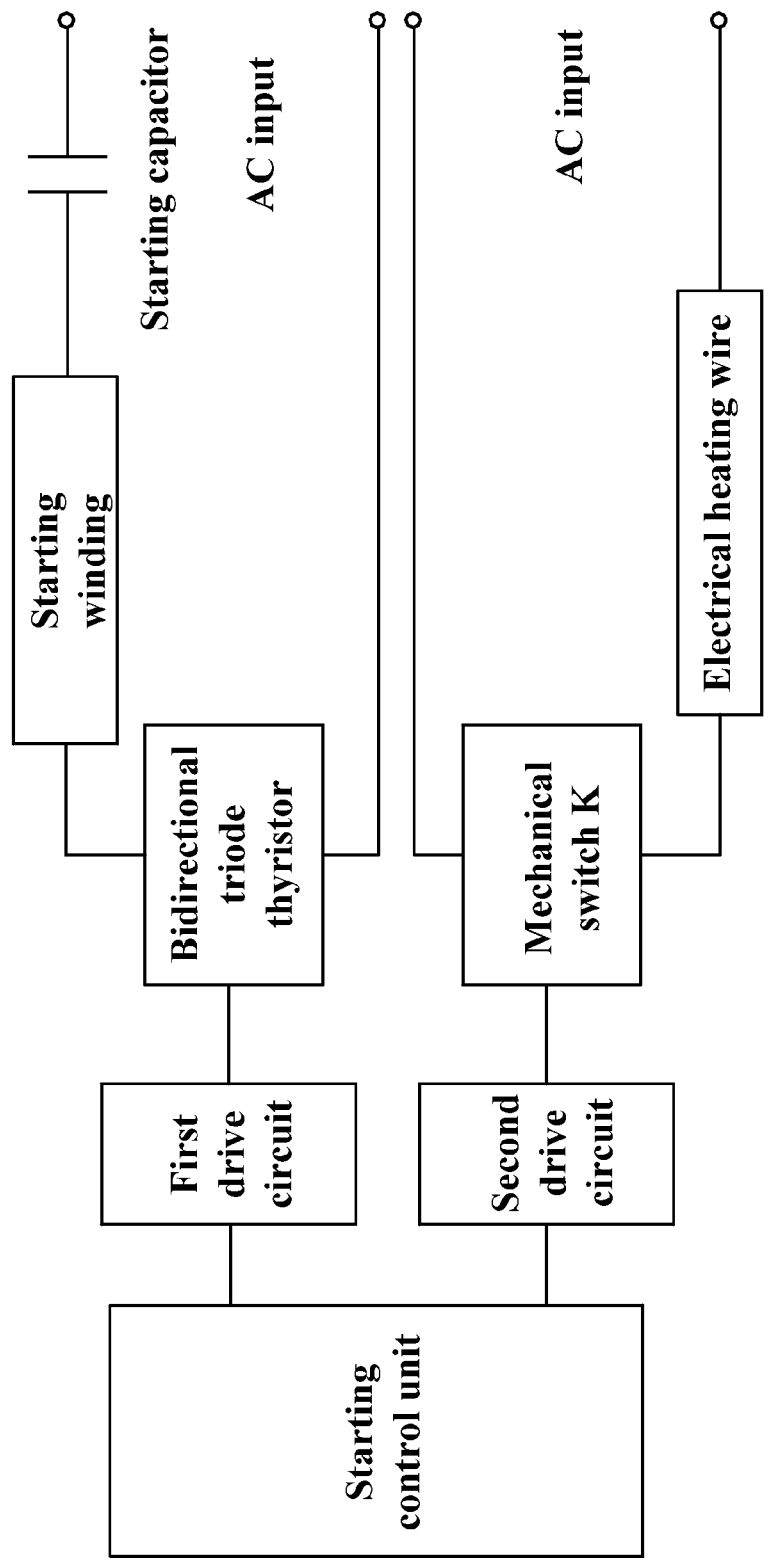
FIG. 1 is a block diagram of a control circuit for a single-phase AC motor of a dryer of an exemplary embodiment of the invention.
Figure 2:
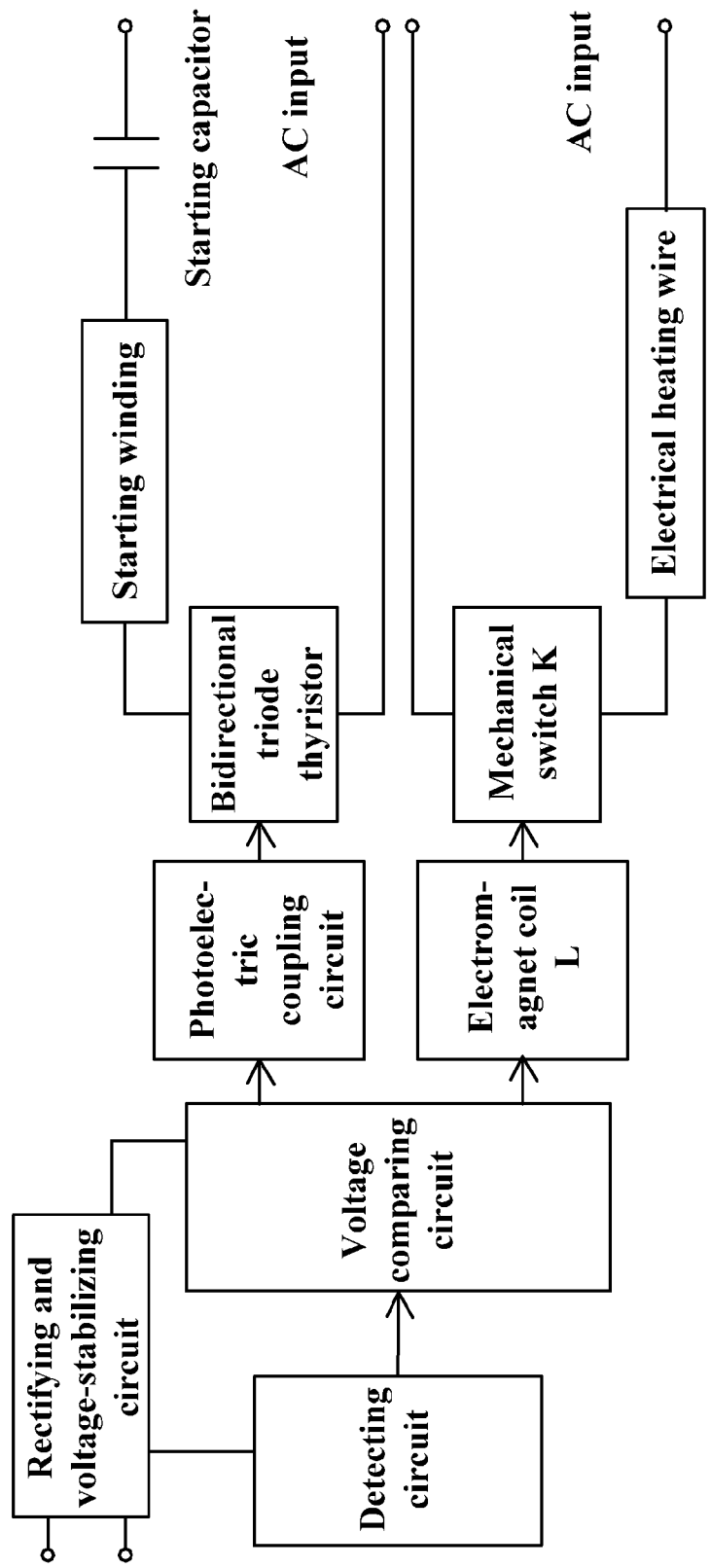
FIG. 2 is a detailed block diagram of FIG. 1.

As shown in FIGS. 1 and 2, a control circuit for a single-phase AC motor of a dryer of the invention comprises an electronic starting circuit comprising a starting control unit, a first drive circuit, and a bidirectional triode thyristor, a second drive circuit, and a mechanical switch K. The bidirectional triode thyristor is serially connected to a starting winding and a starting capacitor of the motor, and connected to an AC input, the starting control unit is connected to a control end of the bidirectional triode thyristor via the first drive circuit, the mechanical switch K is serially connected to an electrical heating wire, and connected to the AC input, the starting control unit is connected to a control end of the mechanical switch K via the second drive circuit, and the first drive circuit and the second drive circuit are interlocked with each other whereby enabling the mechanical switch K to be switched off as the bidirectional triode thyristor is conducting, and the mechanical switch K to be switched on as the bidirectional triode thyristor is cut off.

The starting control unit comprises a rectifying and voltage-stabilizing circuit, a detecting circuit, and a voltage comparing circuit. An input end of the rectifying and voltage-stabilizing circuit is connected to the AC input, and an output end of the rectifying and voltage-stabilizing circuit operates as a low-voltage DC power supply for the detecting circuit and the voltage comparing circuit. The detecting circuit detects an electric signal from a main winding of the motor and inputs the electric signal to the voltage comparing circuit for further processing, and an output end of the voltage comparing circuit is connected to input ends of the first drive circuit and the second drive circuit.

Figure 3:
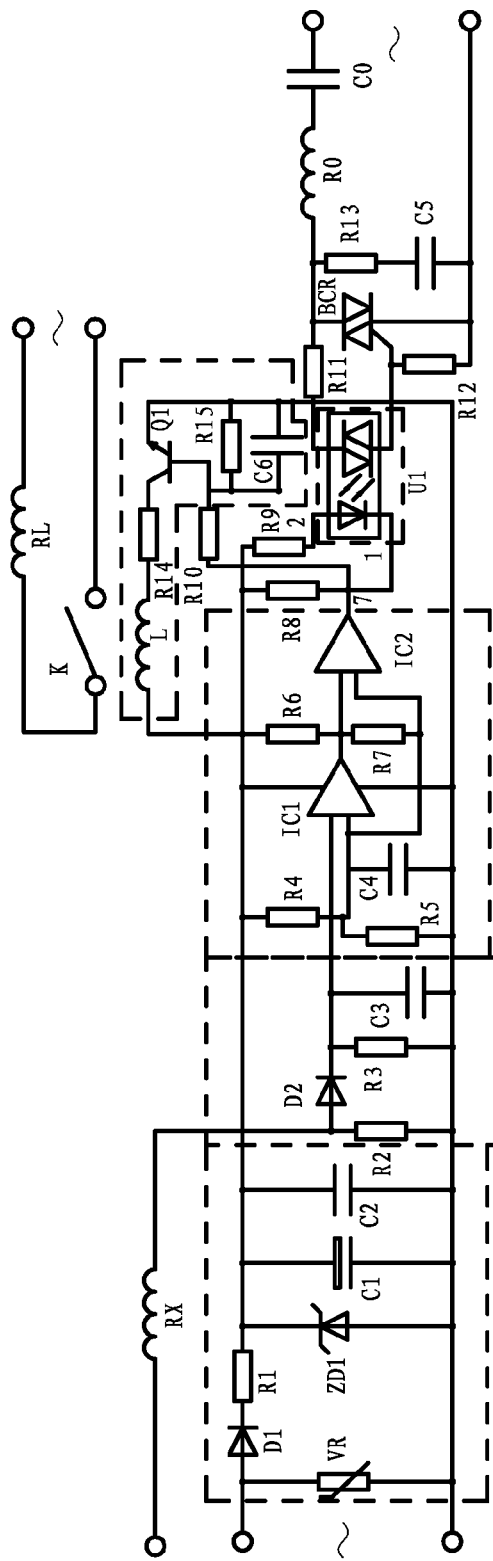
FIG. 3 is a schematic diagram of a control circuit for a single-phase AC motor of a dryer of an exemplary embodiment of the invention.

As shown in FIG. 3, the rectifying and voltage-stabilizing circuit comprises a diode D1, a resistor R1, a fuse VR, a voltage stabilizing tube ZD1, and a pair of capacitors C1 and C2. The detecting circuit comprises a pair of resistors R2 and R3, a diode D2, and a capacitor C3, and operates to detect an electric signal from a main winding RX of the motor, and to output the signal via the capacitor C3 after the signal is rectified via the diode D2. The voltage comparing circuit is a hysteresis control circuit, and comprises a previous comparator IC1, multiple resistors R4-R7, a capacitor C4, and a post comparator IC2.

As shown in FIG. 3, a first drive circuit is a photoelectric coupler U1, and a pair of resistors R11 and R12. A resistor R8 is connected between an output end of the post comparator IC2 and an output end of the rectifying and voltage-stabilizing circuit. A first pin of the photoelectric coupler U1 is connected to an output end 7 of the post comparator IC2, and a second pin of the photoelectric coupler U1 is serially connected to a resistor R9, and then connected to the output end of the rectifying and voltage-stabilizing circuit.

The second drive circuit comprises an electromagnet coil L, a triode Q1, a capacitor C6, and a pair of resistors R14 and R15. The electromagnet coil L is serially connected to the resistor R14, and then connected to a collecting electrode of the triode Q1. The resistor R15 and the capacitor C6 are parallel connected between a base electrode and an emitting electrode of the triode Q1. The emitting electrode of the triode Q1 is connected to the output end of the rectifying and voltage-stabilizing circuit, and a resistor R10 is serially connected between the base electrode of the triode Q1 and the output end 7 of the post comparator IC2.

Operation principle of the invention is: as a power supply is switched on, the main winding RX of the motor is powered on and operates, the detecting circuit detects a current signal from the main winding RX is large enough and input to an input end of the hysteresis control circuit, an output end of the hysteresis control circuit outputs low level, namely an input of the first pin of the photoelectric coupler U1 is low level, and an input of the base electrode of the triode Q1 is low level. At this time the photoelectric coupler U1 is conducting, the triode Q1 is cut off, the photoelectric coupler U1 triggers the bidirectional triode thyristor to be connected to a starting winding RO and a starting capacitor C0, the second drive circuit is cut off, the electromagnet coil L does not operate, the mechanical switch K is switched off, and electrical heating wire drive circuit does not operate, and the starting winding of the motor starts the motor to operate. As a motor speed is 70%-85% of a synchronous speed, the detecting circuit detects a current signal from the main winding RX is small, an output end of the hysteresis control circuit outputs high level, namely an input of the first pin of the photoelectric coupler U1 is high level, and an input of the base electrode of the triode Q1 is low level. At this time the photoelectric coupler U1 is cut off, the triode Q1 is conducting, the second drive circuit is conducting, the electromagnet coil L is powered on and switches on the mechanical switch K whereby connecting the electrical heating wire RL, a starting winding drive circuit stops operating, and the electrical heating wire drive circuit controls the motor to operate. Automatic adjustment is facilitated via a reference voltage of the hysteresis control circuit, as the motor speed decreases to a certain value of 40% of the synchronous speed for example, the detecting circuit detects a current signal from the main winding RX is large enough, the output end of the hysteresis control circuit outputs low level, namely the input of the first pin of the photoelectric coupler U1 is low level, and the input of the base electrode of the triode Q1 is low level. At this time the photoelectric coupler U1 is conducting, the triode Q1 is cut off, the photoelectric coupler U1 triggers the bidirectional triode thyristor to be connected to the starting winding R0 and the starting capacitor C0, the electrical heating wire drive circuit does not operate, and the starting winding of the motor restart the motor. Therefore a circulation process is formed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A control circuit for a single-phase AC motor of a dryer, comprising:
   an electronic starting circuit comprising a starting control unit, a first drive circuit, and a bidirectional triode thyristor;
   a second drive circuit; and
   a mechanical switch K;
   wherein
   said bidirectional triode thyristor is serially connected to a starting winding and a starting capacitor of said motor, and connected to an AC input;
   said starting control unit is connected to a control end of said bidirectional triode thyristor via said first drive circuit;
   said mechanical switch K is serially connected to an electrical heating wire, and connected to said AC input;
   said starting control unit is connected to a control end of said mechanical switch K via said second drive circuit; and
   said first drive circuit and said second drive circuit are interlocked with each other whereby enabling said mechanical switch K to be switched off as said bidirectional triode thyristor is conducting, and said mechanical switch K to be switched on as said bidirectional triode thyristor is cut off.

2. The control circuit of claim 1, wherein
   said second drive circuit comprises an electromagnet coil L;
   said electromagnet coil L switches on said mechanical switch K as said second drive circuit is conducting; and
   said electromagnet coil L stops operating and said mechanical switch K is switched off as said second drive circuit is cut off.

3. The control circuit of claim 2, wherein
   said second drive circuit comprises a triode Q1;
   a collecting electrode of said triode Q1 is serially connected to a resistor R14, and connected to said electromagnet coil L;

a base electrode thereof is serially connected to a resistor R10, and connected to an output end 7 of a post comparator IC2;

an emitting electrode thereof is connected to an output end of said rectifying and voltage-stabilizing circuit; and conduction of said triode Q1 causes said electromagnet coil L to switch on said mechanical switch K and thus enabling electrical heating wire to operate.

4. The control circuit of claim 1, wherein said starting control unit comprises a rectifying and voltage-stabilizing circuit, a detecting circuit, and a voltage comparing circuit.

5. The control circuit of claim 4, wherein an input end of said rectifying and voltage-stabilizing circuit is connected to said AC input; and an output end of said rectifying and voltage-stabilizing circuit operates as a low-voltage DC power supply for said detecting circuit and said voltage comparing circuit.

6. The control circuit of claim 4, wherein said detecting circuit detects an electric signal from a main winding of said motor and inputs said electric signal to said voltage comparing circuit for further processing; and an output end of said voltage comparing circuit is connected to input ends of said first drive circuit and said second drive circuit.

7. The control circuit of claim 4, wherein said voltage comparing circuit is a hysteresis control circuit.

8. The control circuit of claim 1, wherein said first drive circuit is a photoelectric coupling circuit.

* * * * *